T. McC. DE BINGHAM.
TELEGRAPHIC RECORDING APPARATUS.
APPLICATION FILED JULY 22, 1910.
997,651.
Patented July 11, 1911.
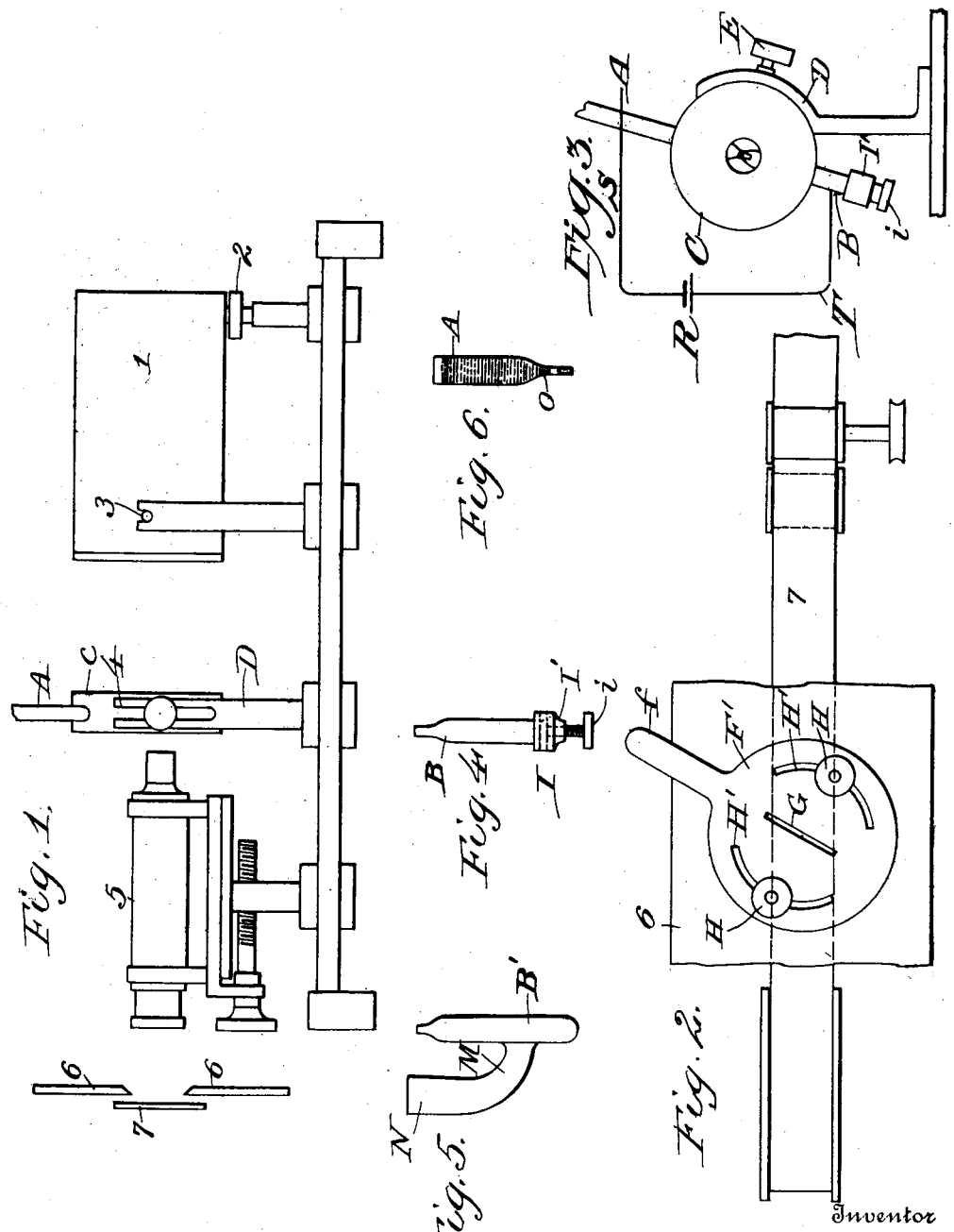
Witnesses
M. Hefling
Jos. W. Lacey
Inventor
Thomas McClelland De Bingham
By B. Singer,
Attorney

UNITED STATES PATENT OFFICE.

THOMAS McCLELLAND DE BINGHAM, OF LONDON, ENGLAND.

TELEGRAPHIC RECORDING APPARATUS.

997,651.  Specification of Letters Patent.  Patented July 11, 1911.

Application filed July 22, 1910.  Serial No. 573,213.

*To all whom it may concern:*

Be it known that I, THOMAS MCCLELLAND DE BINGHAM, a subject of the King of Great Britain, residing at 3 and 4 Clements Inn, London, England, have invented certain new and useful Improvements in Telegraphic Recording Apparatus, of which the following is a specification.

This invention relates to that class of electrocapillary apparatus for recording telegraphic signals in which a difference of potential is caused to produce an excursion of the meniscus at the end of a thread of mercury contained by a capillary tube wherein the end of such thread of mercury makes contact with a suitable electrolyte, such as dilute sulfuric acid. The movements of the column of mercury in the capillary tube are photographically recorded on a traveling surface, such as tape. In this class of apparatus it is the practice to introduce into a suitable vessel the capillary end of a tube containing a column of mercury. In fitting up the apparatus the capillary end of the mercury tube is first caused to enter the electrolyte, and by means of a compressor an air pressure is applied on the top surface of the mercury until the pressure causes the mercury to flow out from the capillary end and drive out the air. The pressure is then released and the surface tension causes the mercury to rise which draws up the electrolyte into the part from which the air was expelled. Terminals are fused into the respective tubes so as to make good electric contact with the fluid conductors contained by them. In order photographically to record the movements of the meniscus due to changes in the actuating potential differences, a beam of light is projected through an aperture in a screen and is adapted to be more or less screened or diverted by the movements of the thread of mercury in the capillary end of the mercury tube which is located between the source of light and the said aperture. Behind the aperture and within a dark chamber a sensitized tape or other surface is caused to travel by any well known or other suitable means and it is upon this that a record (controlled by the position of the meniscus) is photographically printed. On the opposite side of the screen is located the capillary end of the mercury tube in such a position that the movement of the mercury will intersect the beam of light passing through the aperture in the screen and the image may be enlarged by means of a microscope in any well known manner.

The present improvements particularly relate to the capillary tube and the container for the electrolyte and the manner of mounting the same, also to the screen and the manner of mounting the same as hereinafter particularly described with reference to the accompanying drawing, in which:—

Figure 1 is a diagram showing the whole of the apparatus hereinbefore referred to. Fig. 2 shows the preferred construction of the screen with the tape running behind it. Fig. 3 shows the capillary tube, the container for the electrolyte, both together so arranged that their angle of inclination may be varied, and another form of screen in front of the same. Fig. 4 shows one form of displacer for the electrolyte. Fig. 5 shows another form of the same. Fig. 6 shows a further improvement.

In Fig. 1, I have shown at 1 the lamp which may be of any suitable construction, and which is adjustable by means of the thumb screw or the like at 2, being capable of swinging on pivots at 3 as will be readily understood. At 4 is placed the mercury tube and container for the electrolyte. At 5 the usual microscope arrangement will be found while at 6 I have indicated the screen and at 7 the tape.

It is an essential feature of this invention that in order to improve the form of the curves I provide means whereby the meniscus in its excursions, upward say, will, as far as practicable, follow the travel of the tape. In order to do that it is essential that the meniscus should move not perpendicularly up and down, but at a slight angle to the perpendicular and this angle will vary with the speed of travel imparted to the tape. I attain this by mounting the capillary tube A together with the container for the electrolyte B in a carrier C mounted on a curved support D and fixed in position by a set screw E as illustrated in Figs. 1 and 3. It will be readily understood that by releasing the set screw E the carrier C may be turned in a circle, the center of which is at or near the point where the meniscus is formed. As will be seen in Fig. 3 the aperture in the carrier C is circular and the carrier may in this case act as the screen; I obtain, however, better definition of the curves, by permitting the image to fall through a slot which should have the same angular inclination as the capillary tube and container. To this end I adopt the arrangement shown in Fig. 2, in which F' is the screen, f a handle to adjust the screen, G is the slot, while H, H, are set screws and H', H', are slots for fixing the screen in position as will be readily understood. In Fig. 3 I have shown the screen next to the meniscus; in Fig. 2 I have shown it, as in Fig. 1, next to the tape; either arrangement may be adopted and in some cases I may have a screen with a circular hole next to the meniscus and another with a slot next to the tape.

In Fig. 3, I have shown the necessary electrical connections, which consist of a suitable source of current, R, a wire S leading therefrom and connected to the capillary tube A, and a second wire leading from R and connected to the electrolyte container B.

I adopt a displacer as illustrated in Figs. 3, 4 and 5, to regulate the level of the electrolyte in its container. Figs. 3 and 4 show the displacer in the shape of a small piston I in the interior of a metal cap I' at the end of the container B. The piston I is worked by a screw i extending outward.

In Fig. 5 I modify the arrangement as follows:—Laterally from the container B', extends a branch M which leads to a vessel N. If the level of the liquid in B' falls the excess in N will supply the deficiency and when required N may be refilled. The effect in this case corresponds to that of the upper movement of the piston illustrated in Fig. 4.

In Fig. 6 I have shown an arrangement that will enable me to obtain a much more clearly defined curve on the tape than could heretofore be done. It will be seen that the capillary tube A contains mercury to the upper level of the space O, and mercury again below the space O. The intervening space is filled with a drop of liquid conductor or the electrolyte. As the mercury is opaque and the acid transparent the light will pass above and below the meniscus and hence a very clearly defined image is obtained.

I claim:—

1. In telegraphic recording apparatus, the combination of a capillary tube and electrolyte container, a lamp arranged on one side thereof, a microscope arranged on the other side of said capillary tube and electrolyte container, and a photographic surface arranged to receive rays of light traveling from said lamp through the meniscus in said capillary tube and through said microscope.

2. In telegraphic recording apparatus, the combination of an adjustable capillary tube and electrolyte container, a lamp arranged on one side thereof, a microscope arranged on the other side of said capillary tube and electrolyte container, and a traveling photographic surface arranged to receive rays of light traveling from said lamp through the meniscus in said capillary tube and through said microscope.

3. In telegraphic recording apparatus, the combination of an adjustable capillary tube and electrolyte container having a displacer, a lamp arranged on one side thereof, a microscope arranged on the other side of said capillary tube and electrolyte container, and a traveling photographic surface arranged to receive rays of light traveling from said lamp through the meniscus in said capillary tube and through said microscope.

4. In telegraphic recording apparatus the combination of a lamp, an adjustable capillary tube and electrolyte container, a microscope arrangement and a traveling photographic surface with a slotted adjustable screen interposed between the photographic surface and the capillary tube arrangement.

5. In telegraphic recording apparatus the combination of a lamp, an adjustable capillary tube and electrolyte container having a displacer, a microscopic arrangement and a traveling photographic surface with a slotted adjustable screen interposed between the photographic surface and the capillary tube arrangement.

6. In a telegraphic recording apparatus and adjustable lamp, a capillary tube and electrolyte container, and a photographic sensitized surface, all so located with reference to one another that a beam of light from the lamp may be received by the meniscus in the capillary tube and thrown onto the photographic surface.

7. In a telegraphic recording apparatus having a capillary tube and electrolyte container, a photographic sensitized surface, and a screen interposed between the capillary tube and said photographic sensitized surface, said screen having a slot inclined in a direction parallel with the travel of the meniscus in the capillary tube.

8. In a telegraphic recording apparatus having a capillary tube and electrolyte container, a photographic sensitized surface, a screen interposed between the capillary tube and said photographic sensitized surface, said screen having a slot therein, and means for adjusting said screen so that said slot may be inclined in a direction parallel with the travel of the meniscus in the capillary tube.

9. In a telegraphic recording apparatus an adjustable capillary tube and electrolyte container, a photographic sensitized surface, and a screen interposed between the capillary tube and said photographic sensitized surface, said screen having a slot inclined in a direction parallel with the travel of the meniscus in the capillary tube.

10. In telegraphic recording apparatus having a capillary tube and electrolyte container and a photographic sensitized surface, a screen adjacent to the meniscus and another screen adjacent to the sensitized surface.

11. In telegraphic recording apparatus having a capillary tube and electrolyte container and a photographic sensitized surface, a screen adjacent to the meniscus and another screen adjacent to the sensitized surface, one of said screens having a slot inclined to correspond with the travel of the meniscus.

12. In telegraphic recording apparatus, an electrolyte container and a capillary tube containing a column of mercury, a drop of transparent substance contained in said mercury column and adapted to travel with the mercury, a lamp arranged on one side of said container and capillary tube, and a photographic surface arranged to receive rays of light traveling from said lamp through said transparent substance.

13. In telegraphic recording apparatus, an electrolyte container and a capillary tube containing a column of mercury, a drop of transparent substance contained in said mercury column and adapted to travel with the mercury, a lamp arranged on one side of said container and capillary tube, a microscope arranged on the opposite side thereof, and a traveling photographic surface arranged to receive rays of light traveling from said lamp through said transparent substance and said microscope.

In testimony whereof I have hereunto set my hand in the presence of two witnesses.

THOMAS McCLELLAND DE BINGHAM.

Witnesses:
BERNHARD JAMES,
WALTER J. SKERTEN.

Copies of this patent may be obtained for five cents each, by addressing the "Commissioner of Patents, Washington, D. C."